United States Patent
Fukuhara

(10) Patent No.: US 11,305,358 B2
(45) Date of Patent: Apr. 19, 2022

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Yousuke Fukuhara, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 189 days.

(21) Appl. No.: 16/620,656

(22) PCT Filed: Jun. 20, 2018

(86) PCT No.: PCT/JP2018/023499
§ 371 (c)(1),
(2) Date: Dec. 9, 2019

(87) PCT Pub. No.: WO2019/004030
PCT Pub. Date: Jan. 3, 2019

(65) Prior Publication Data
US 2020/0094328 A1    Mar. 26, 2020

(30) Foreign Application Priority Data

Jun. 29, 2017 (JP) .............................. JP2017-127330

(51) Int. Cl.
*B23B 27/14* (2006.01)
*B23B 27/04* (2006.01)
*B23B 27/22* (2006.01)

(52) U.S. Cl.
CPC .......... *B23B 27/145* (2013.01); *B23B 27/045* (2013.01); *B23B 27/143* (2013.01); *B23B 27/22* (2013.01); *B23B 2200/0447* (2013.01); *B23B 2200/081* (2013.01); *B23B 2200/087* (2013.01)

(58) Field of Classification Search
CPC ... B23B 27/143; B23B 27/045; B23B 27/145; B23B 27/22; B23B 2200/0447; B23B 2200/32; B23B 2200/321; B23B 2200/081
See application file for complete search history.

(56) References Cited

U.S. PATENT DOCUMENTS

2017/0066060 A1    3/2017    Tsuda

FOREIGN PATENT DOCUMENTS

| JP | 02-145903 a | 6/1990 |
| JP | 04-146008 A | 5/1992 |
| JP | 10-217008 A | 8/1998 |
| JP | 10217008 A * | 8/1998 |
| JP | 11-033803 A | 2/1999 |
| JP | 2012-250296 A | 12/2012 |
| WO | 2015/129836 A1 | 9/2015 |

* cited by examiner

*Primary Examiner* — Boyer D Ashley
*Assistant Examiner* — Stephen Sun Cha
(74) *Attorney, Agent, or Firm* — Volpe Koenig

(57) ABSTRACT

A cutting insert according to an aspect includes a base portion and a cutting portion. The cutting portion includes an upper surface, a side surface, a ridge line including a first ridge line and a second ridge line, and an intersection point. The upper surface includes a top surface region and a rising surface region located between the top surface and the ridge line, and having a shape protruding toward the intersection point. In a top view, a first distance from the first ridge line to the rising surface increases as close to the intersection point, and a second distance from the second ridge line to the rising surface increases as close to the intersection point.

12 Claims, 16 Drawing Sheets

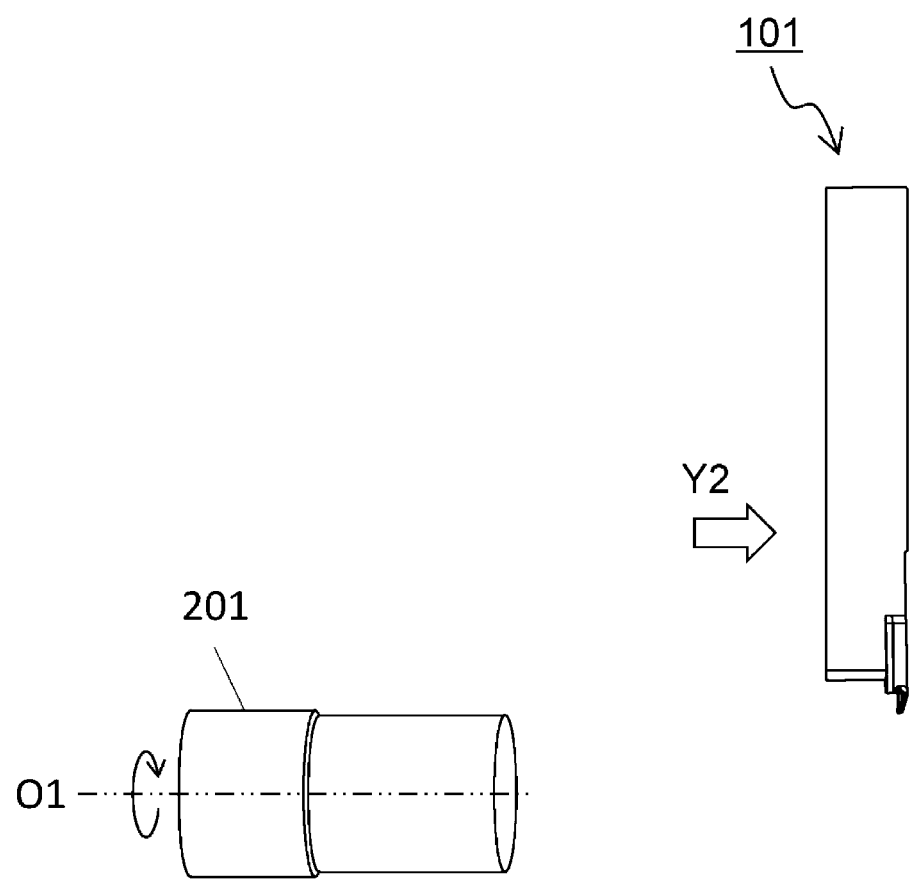

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/023499 filed on Jun. 20, 2018, which claims priority to Japanese Application No. 2017-127330 filed on Jun. 29, 2017, which are entirely incorporated herein by reference.

TECHNICAL FIELD

The present disclosure relates to a cutting insert used in a cutting process.

BACKGROUND ART

As a cutting insert used in turning processing of a workpiece such as metal, a throw-away type tip (tip) is discussed in, for example, JP 11-033803 A (Patent Document 1), JP 2012-250296 A (Patent Document 2) and JP 02-145903 Y (Patent Document 3). The tip discussed in Patent Document 3 is a tip used for a cutting process referred to as a back-machining or post-grinding, and includes a cut surface positioned at a front end in a cutting direction, a cutting surface connected to the cut surface and positioned on the front end side in the cutting direction of the cut surface, a first breaker groove positioned along the cut surface, and a second breaker groove positioned along the cutting surface.

In the tip described in Patent Document 3, the width of each of the first breaker groove and the second breaker groove decreases toward the front end side in the cutting direction. Therefore, chips generated on the cut surface and the cutting surface easily advance toward the rear end side in the cutting direction, and there has been a possibility that a finished surface of a workpiece is damaged by these chips.

SUMMARY OF INVENTION

A cutting insert according to a non-limiting aspect may include a base portion and a cutting portion projecting from the base portion toward a first end. The cutting portion may include an upper surface extending from the base portion toward the first end, a first side surface positioned on a side of the first end, a second side surface adjacent to the first side surface, a first cutting edge positioned at least in a part of a ridge line where the upper surface and the first side surface intersect, and a second cutting edge positioned at least in a part of a ridge line where the upper surface and the second side surface intersect. A ridge line where the upper surface and the first side surface intersect is defined as a first ridge line, a ridge line where the upper surface and the second side surface intersect is defined as a second ridge line, and a portion where the first ridge line and the second ridge line intersect is defined as an intersection point. The upper surface may include a top surface region and a rising surface region inclined toward the top surface region as proceeding away from the first ridge line and the second ridge line. The rising surface region may have a shape protruding toward the intersection point, and a distance from the first ridge line may increase in a direction from the first end toward the intersection point, and a distance from the second ridge line may increase in a direction along the second ridge line from the intersection point in a top view.

BRIEF DESCRIPTION OF DRAWINGS

FIG. 16 is a schematic diagram illustrating a method for manufacturing a machined product according to a non-limiting embodiment.

DESCRIPTION OF EMBODIMENTS

Insert

A cutting insert (hereinafter also referred to simply as an insert) according to non-limiting embodiments will be described in detail below with reference to the drawings. However, each of the figures referred to below is a simplified representation of only main members necessary for description of the non-limiting embodiments. Thus, the insert may include any constituent member not illustrated in each of the figures referred to. In addition, the dimensions of members in the respective figures do not accurately represent the actual dimensions of constituent members, the dimensional ratio of respective members, or the like.

Figure 1:
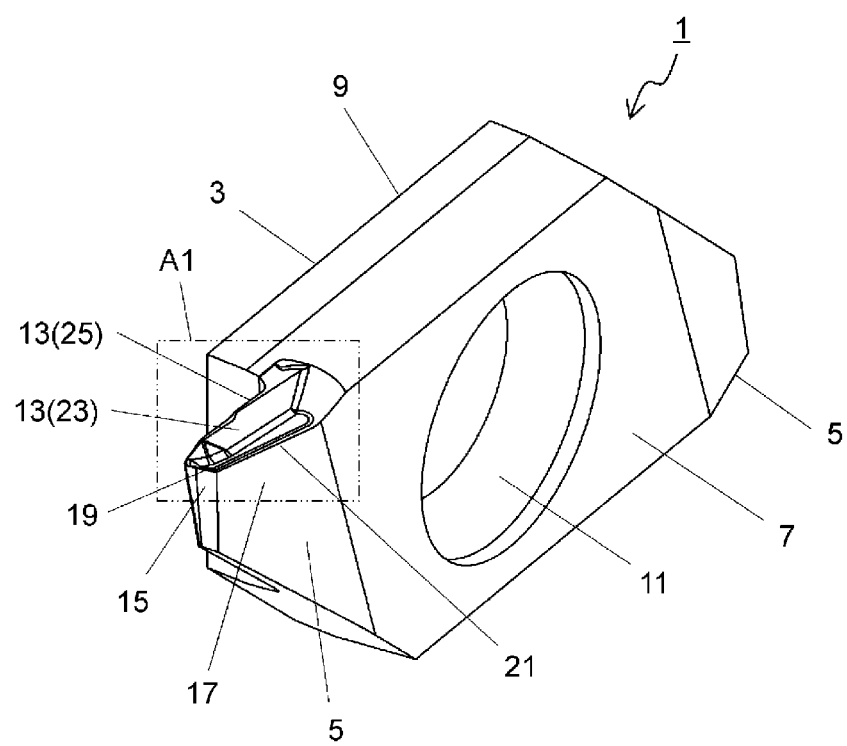
FIG. 1 is a perspective view illustrating a cutting insert according to a non-limiting embodiment.

An insert 1 as a non-limiting example illustrated in FIG. 1 may include a base portion 3 and a plurality of cutting portions 5. The base portion 3 may be a site constrained by a holder when the insert 1 is attached to the holder, and the cutting portions 5 may be sites coming into contact with a workpiece in a cutting process of a workpiece. The cutting portions 5 may be sites having a main role in the cutting process. The insert 1 may include the plurality of cutting portions 5 as the non-limiting example illustrated in FIG. 2, or may include only one cutting portion 5.

A shape of the base portion 3 is not limited to a specific configuration. The base portion 3 may include a configuration of, for example, a bar shape, a polygonal plate shape, or a polygonal column shape. The base portion 3 in the non-limiting example illustrated in FIG. 1 may have a hexagonal plate shape. The base portion 3 in the present example may include a first main surface 7 that is of a hexagon, a second main surface 9 that is of a hexagon and positioned on the opposite side of the first main surface 7, and a through hole 11 opened at the center of the first main surface 7 and at the center of the second main surface 9. In case that the insert 1 is attached to a holder, for example, the insert 1 can be fixed to the holder by inserting a screw into the through hole 11.

A size of the base portion 3 is not particularly limited. For example, a maximum width in a direction from the first main surface 7 to the second main surface 9 may be set to about 2.9 to 4.1 mm. In addition, the width of the first main surface 7 in a left-right direction in FIG. 2 may be set to about 13.5 to 15 mm.

Figure 2:
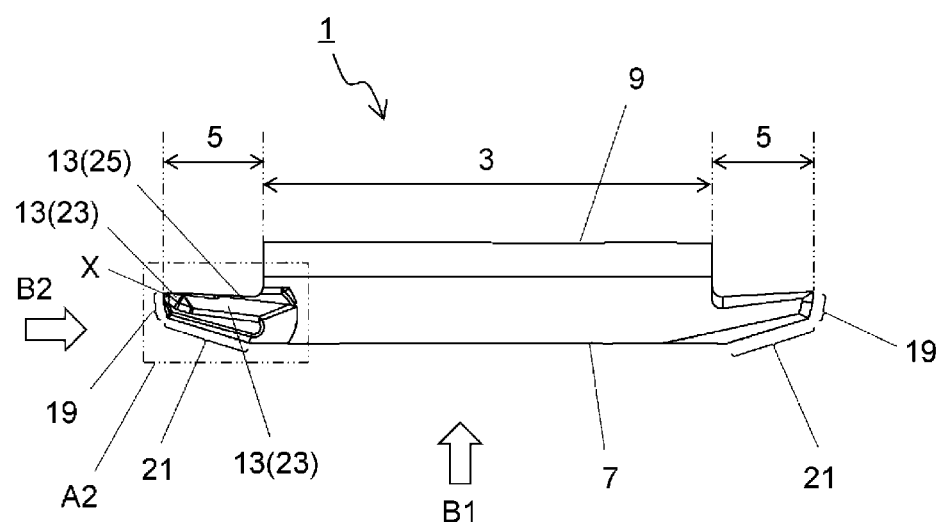
FIG. 2 is a front view of the cutting insert illustrated in FIG. 1 as viewed from a side of the upper surface.
Figure 3:
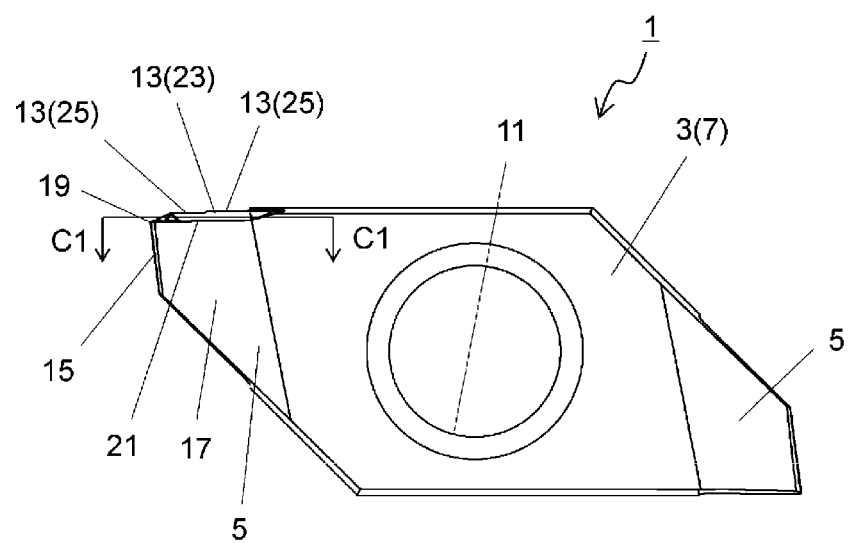
FIG. 3 is a side view of the cutting insert illustrated in FIG. 2 as viewed from a B1 direction.
Figure 4:
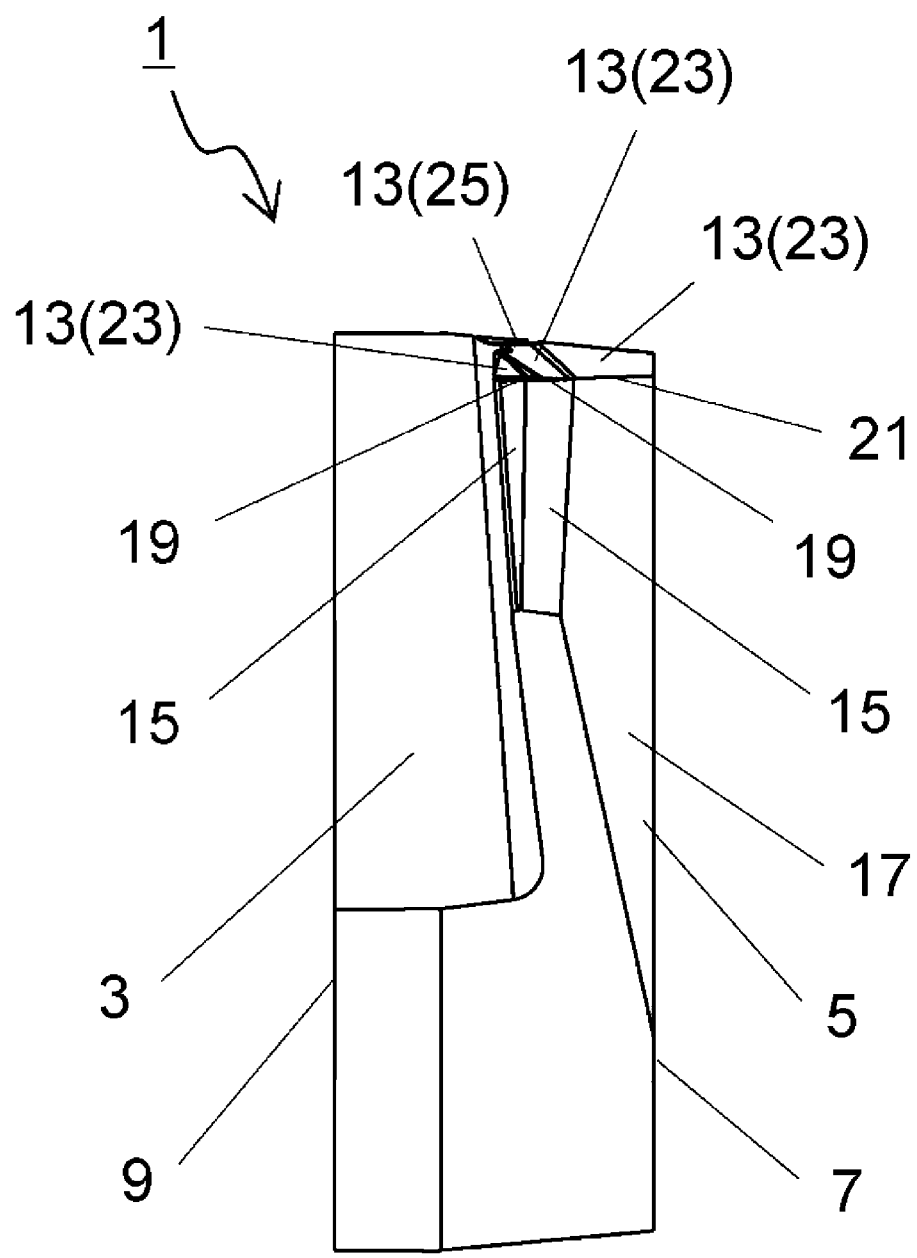
FIG. 4 is a side view of the cutting insert illustrated in FIG. 2 as viewed from a B2 direction.

The insert 1 as a non-limiting example illustrated in FIG. 2 may include two cutting portions 5. Shapes of the two cutting portions 5 are not limited to a specific configuration. The cutting portions 5 may each have a configuration of, for example, a bar shape, a polygonal plate shape, or a polygonal column shape. The shape of each of the two cutting portions 5 in the non-limiting example illustrated in FIG. 1 may be a triangular plate shape. The base portion 3 and the cutting portions 5 of the insert 1 may be formed separately or integrally.

The width of each cutting portion 5 in a direction from the first main surface 7 to the second main surface 9 may be smaller than the width of the base portion 3 in the direction from the first main surface 7 to the second main surface 9. If the width of the base portion 3 is relatively large, the insert 1 can be fixed stably to the holder by ensuring the thickness of the base portion 3. In addition, if the width of the cutting portion 5 is relatively small, a degree of freedom of a cutting width in the cutting process of a workpiece can be increased. Note that if the widths of the base portion 3 and the cutting portion 5 are different as described above, regions of the base portion 3 and the cutting portion 5 in the insert 1 may be divided by the portions having the different widths.

The two cutting portions 5 may project outward from the base portion 3 respectively. In the non-limiting example illustrated in FIG. 2, one of the two cutting portions 5 may protrude leftward from the base portion 3, and the other of the two cutting portions 5 may protrude rightward from the base portion 3. In case that the insert 1 is viewed from the side of the first main surface 7, the two cutting portions 5 may be positioned to be rotationally symmetrical with respect to a central axis of the through hole 11.

In the non-limiting example illustrated in FIG. 1, the two cutting portions 5 may project toward opposite sides to each other and may be rotationally symmetrical with respect to the central axis of the through hole 11, and may include substantially the same configuration. Therefore, the configuration of the cutting portion 5 projecting leftward from the base portion 3 among the two cutting portions 5 will be described in detail below, and description of the cutting portion 5 projecting rightward from the base portion 3 among the two cutting portions 5 will be omitted.

Figure 5:
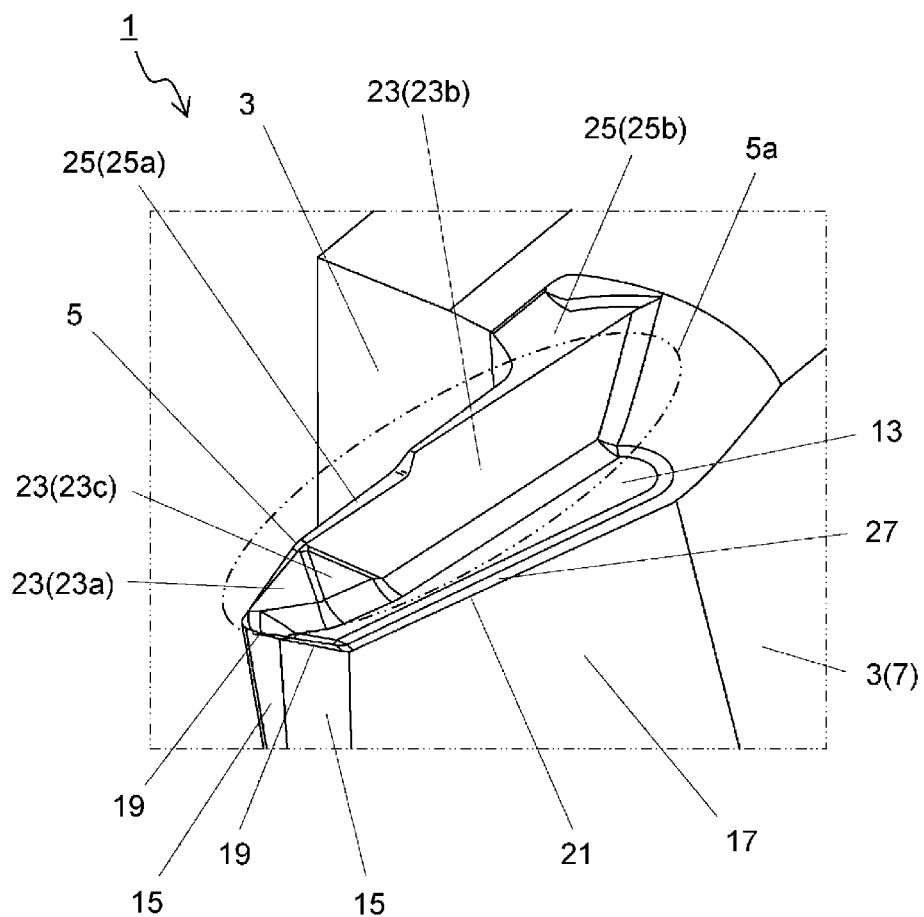
FIG. 5 is an enlarged view of a region A1 illustrated in FIG. 1.

If a left end portion of the insert 1 in the non-limiting example illustrated in FIG. 2 is defined as a first end X, one of the cutting portions 5 may protrude from the base portion 3 toward the first end X. As illustrated in FIG. 5, the cutting portion 5 may include an upper surface 13, a first side surface 15, a second side surface 17, a first cutting edge 19, and a second cutting edge 21.

The upper surface 13 may extend from the base portion 3 toward the first end X. The first side surface 15 may be positioned on the side of the first end X of the base portion 3. The first side surface 15 illustrated in FIG. 5 may be adjacent to the upper surface 13. The second side surface 17 may be adjacent to the first side surface 15. The second side surface 17 illustrated in FIG. 5 may extend from the first main surface 7 of the base portion 3 toward the first end X, and may be also adjacent to the upper surface 13.

In the non-limiting example illustrated in FIG. 5, each of the first side surface 15 and the second side surface 17 may have a generally planar shape. The first side surface 15 and the second side surface 17 may be directly connected, or a curved surface connecting two planes may be positioned between the first side surface 15 and the second side surface 17.

The first cutting edge 19 may be positioned at least in a part of a ridge line (first ridge line) where the upper surface 13 and the first side surface 15 intersect. The first cutting edge 19 may be positioned entirely in the ridge line where the upper surface 13 and the first side surface 15 intersect, or may be positioned only in a part of the ridge line described above. In the non-limiting example illustrated in FIG. 5, the first cutting edge 19 may be positioned entirely in the first ridge line where the upper surface 13 and the first side surface 15 intersect.

The second cutting edge 21 may be positioned at least in a part of a ridge line (second ridge line) where the upper surface 13 and the second side surface 17 intersect. The second cutting edge 21 may be positioned entirely in the ridge line where the upper surface 13 and the second side surface 17 intersect, or may be positioned only in a part of the ridge line described above. In the non-limiting example illustrated in FIG. 5, the second cutting edge 21 may be positioned entirely in the second ridge line where the upper surface 13 and the second side surface 17 intersect.

In addition, in the non-limiting example illustrated in FIG. 5, since the first side surface 15 and the second side surface 17 each have a generally planar shape, the first cutting edge 19 and the second cutting edge 21 may be each linear.

While the first side surface 15 and the second side surface 17 each have a planar shape, the upper surface 13 in the non-limiting example illustrated in FIG. 5 may include a protruding part 5a instead of a planar shape. Specifically, the upper surface 13 in the present example may include a rising surface region 23 and a top surface region 25.

The top surface region 25 in the non-limiting example illustrated in FIG. 5 may have a flat surface shape. In addition, the rising surface region 23 may be inclined toward the top surface region 25 as it is distanced from the first ridge line (first cutting edge 19) and the second ridge line (second cutting edge 21). The protruding part 5a may be formed with the rising surface region 23 and the top surface region 25.

The rising surface region 23 may have a function of controlling an advancing direction of chips generated by the first cutting edge 19 and the second cutting edge 21 and flowing in the upper surface 13. Chips can be curled by bringing the chips into contact with the rising surface region 23. Therefore, the rising surface region 23 may be positioned along the first cutting edge 19 and the second cutting edge 21.

The rising surface region 23 may be separated from the first ridge line (first cutting edge 19) and the second ridge line (second cutting edge 21), or may be connected to the first ridge line (first cutting edge 19) and the second ridge line (second cutting edge 21). In case that the rising surface region 23 is connected to the first cutting edge 19 and the second cutting edge 21, the first cutting edge 19 and the second cutting edge 21 may be regarded as being positioned at a lower end of the rising surface region 23.

The top surface region 25 may be positioned along the rising surface region 23 on the side opposite to the first cutting edge 19 and the second cutting edge 21. In this case, the rising surface region 23 may be positioned between the first cutting edge 19 and the second cutting edge 21 and the top surface region 25.

The top surface region 25 may include only one flat surface, or may include a plurality of flat surfaces having different heights from each other. In the non-limiting example illustrated in FIG. 5, the top surface region 25 may include a first top surface 25a positioned on the side of the first end X and a second top surface 25b positioned between the first top surface 25a and the base portion 3 and positioned above the first top surface 25a. In the present example, the first top surface 25a and the second top surface 25b may be parallel to each other.

The rising surface region 23 in the non-limiting example illustrated in FIG. 6 may have a convex shape toward a portion where the first ridge line and the second ridge line intersect each other (hereinafter referred to as an intersection point) in a top view. In case that the rising surface region 23 has the above-described shape, the thickness of the protruding part 5a on the side of the first end X may be secured while a space for chips generated by the second cutting edge 21 to flow in the upper surface 13 is secured. Therefore, the insert 1 may have high chip discharging performance and high durability as well.

Figure 6:
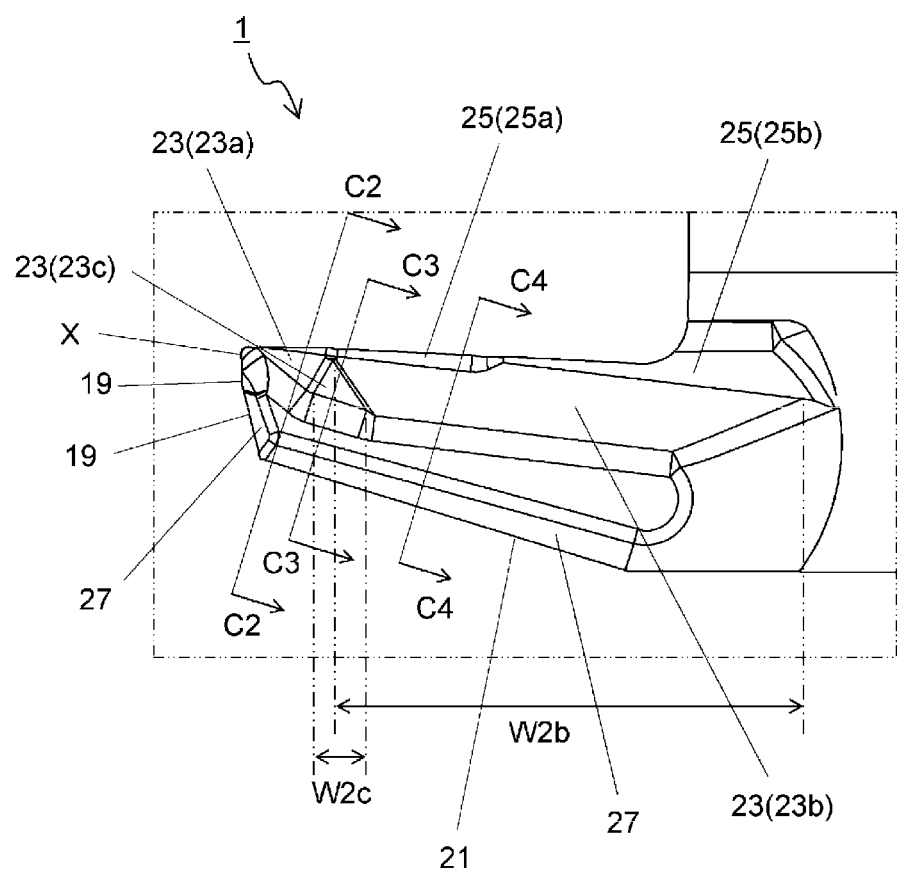
FIG. 6 is an enlarged view of a region A2 illustrated in FIG. 2.

In addition, in the rising surface region 23 in the non-limiting example illustrated in FIG. 6, in the top view, a distance from the first ridge line (first cutting edge 19) may increase in a direction from the first end X to the intersection point, and a distance from the second ridge line may increase in a direction along the second ridge line (cutting edge 21) from the intersection point.

In case that a distance between the rising surface region 23 and the first cutting edge 19 is increased in the direction from the first end X to the intersection point, the advancing direction of chips may be easily controlled. Specifically, the advancing direction of chips generated by the first cutting edge 19 and flowing to the rising surface region 23 may be easily controlled to advance toward the side of the second side surface 17.

In addition, in case that the distance between the rising surface region 23 and the first cutting edge 19 is increased in the direction along the second ridge line from the intersection point, the advancing direction of chips may be easily controlled. Specifically, the advancing direction of chips generated by the second cutting edge 21 and flowing to the rising surface region 23 may be easily controlled to advance toward the side of the second side surface 17.

In the insert 1 according to the present aspect, since the advancing direction of chips is easily controlled as described above, in case that the insert 1 is used for post-grinding or the like, chips may have difficulty advancing toward a finished surface of a workpiece. Therefore, the finished surface of the workpiece may be good.

Here, the distance between the rising surface region 23 and the first ridge line and the second ridge line in the top view may be evaluated by a distance between a boundary line below the rising surface region 23 and the first ridge line and the second ridge line in the top view.

Figure 7:
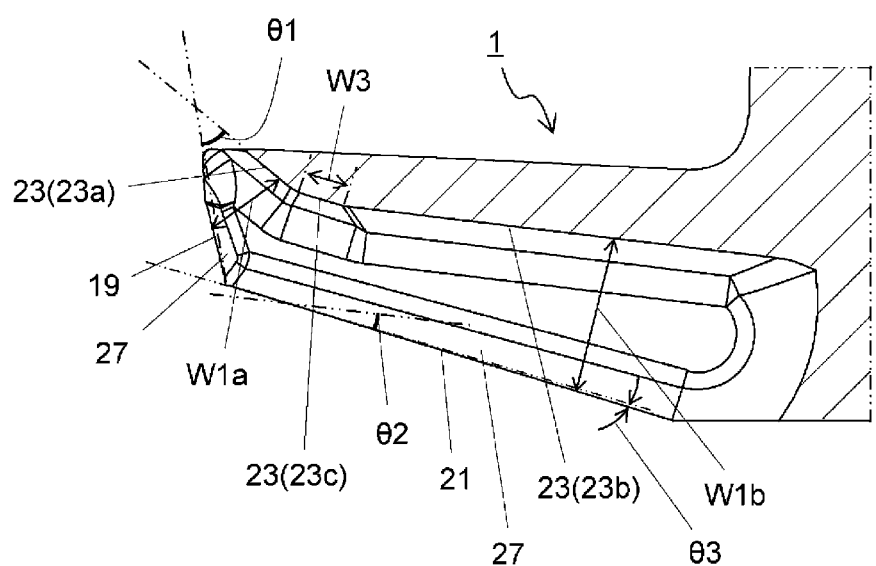
FIG. 7 is a cross-sectional view of a cross section C1-C1 of the cutting insert illustrated in FIG. 3.
Figure 8:
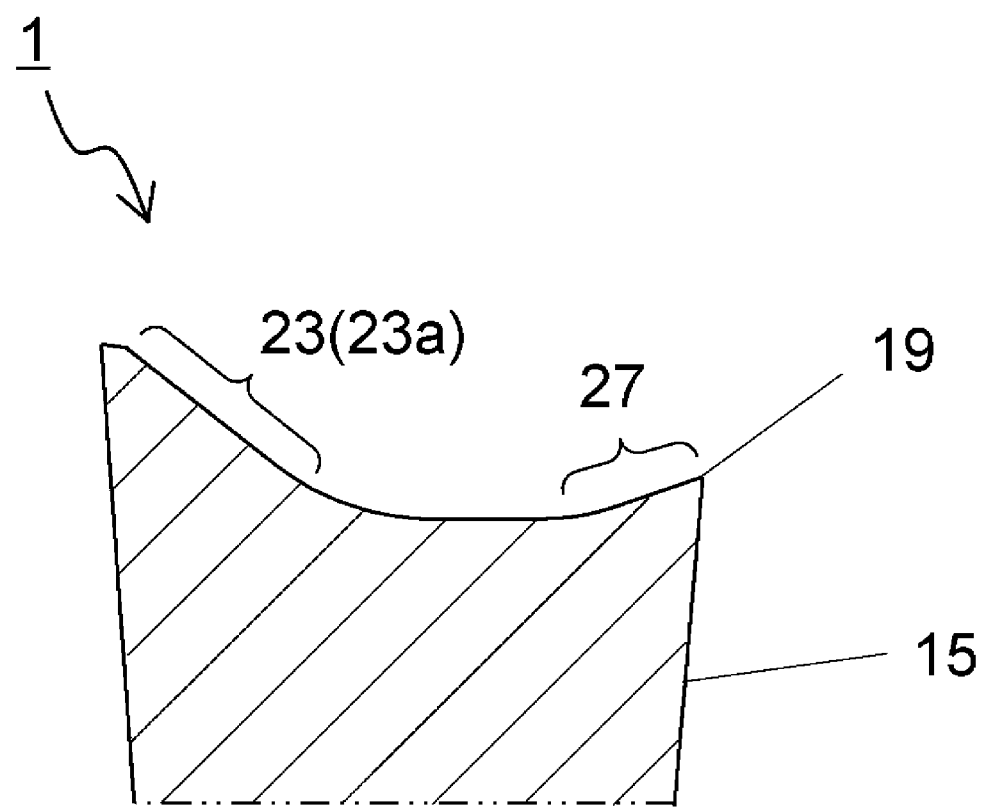
FIG. 8 is a cross-sectional view of a cross section C2-C2 of the cutting insert illustrated in FIG. 6.
Figure 9:
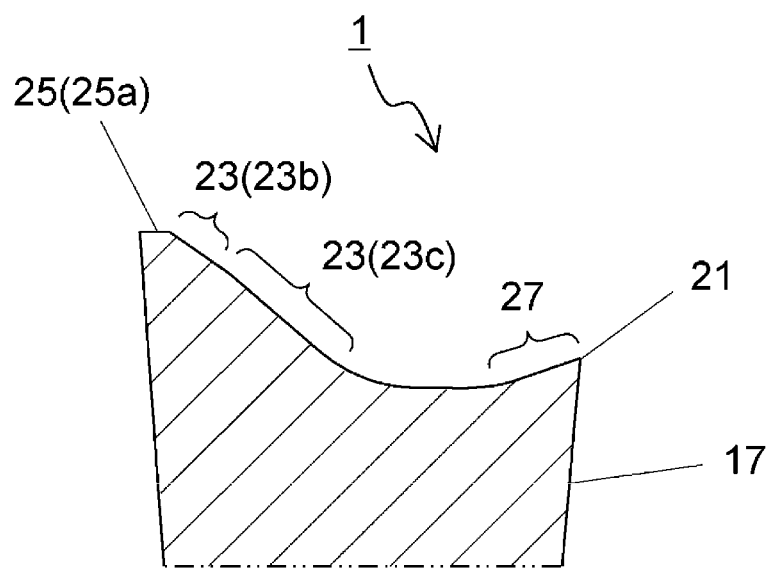
FIG. 9 is a cross-sectional view of a cross section C3-C3 of the cutting insert illustrated in FIG. 6.
Figure 10:
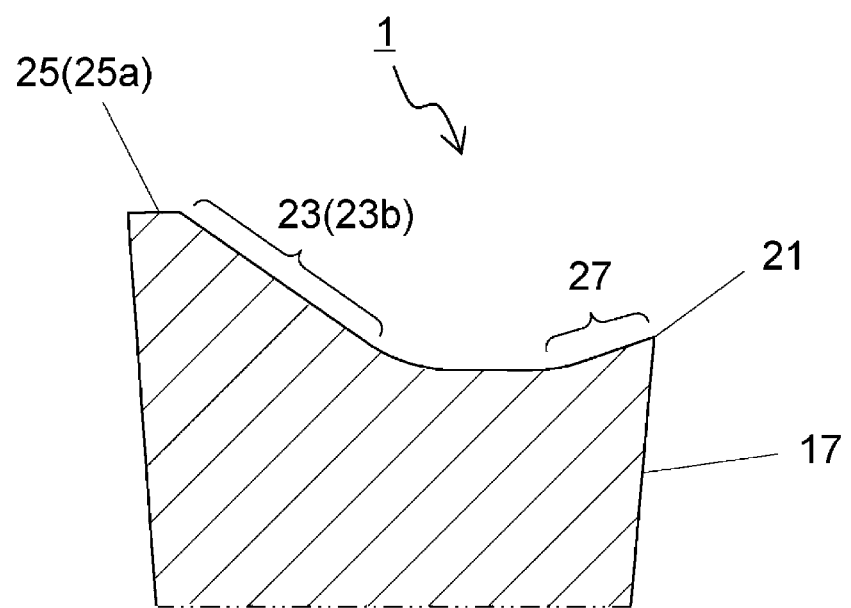
FIG. 10 is a cross-sectional view of a cross section C4-C4 of the cutting insert illustrated in FIG. 6.

Note that in case that the boundary line below the rising surface region 23 is not clear, the evaluation may be performed in a cross section parallel to the top surface region 25, as illustrated in FIG. 7. The evaluation may be performed by a distance between a ridge line where the cross section and the rising surface region 23 intersect, and the first ridge line and the second ridge line.

In the non-limiting example illustrated in FIGS. 6 and 7, the rising surface region 23 may include a first region 23a and a second region 23b. The first region 23a may be positioned along the first ridge line and may have a planar shape. In addition, the second region 23b may be positioned along the second ridge line and may have a planar shape like the first region 23a. As a non-limiting example illustrated in FIGS. 6 and 7, the second region 23b may be positioned further from the first end X than the first region 23a.

As illustrated in the non-limiting example of FIG. 7, in a cross section parallel to the top surface region 25, a distance between the first region 23a and the first cutting edge 19 may be increased as proceeding away from the first end X, or a distance between the second region 23b and the second cutting edge 21 may be increased as proceeding away from the first end X.

Specifically, in the cross section illustrated in FIG. 7, a width W1a of a region sandwiched between the first region 23a and the first cutting edge 19 may be increased from the upper left to the lower right in FIG. 7. In addition, a width W1b of a region sandwiched between the second region 23b and the second cutting edge 21 may be increased from the upper left to the lower right in FIG. 7.

In case that the distance between the first region 23a and the first cutting edge 19 increases as proceeding away from the first end X in the above-described cross section, the advancing direction of chips generated by the first cutting edge 19 and flowing to the first region 23a may be easily controlled to advance toward the side of the second side surface 17.

In addition, in the above-described cross section, in case that the distance between the second region 23b and the second cutting edge 21 is increased as proceeding away from the first end X, the advancing direction of chips generated by the second cutting edge 21 and flowing to the second region 23b may be easily controlled to advance toward the side of the second side surface 17.

The first region 23a and the second region 23b may each have a curved surface shape such as a convex curved surface shape or a concave curved surface shape, or may each have a planar shape as the non-limiting example illustrated in FIG. 5. In case that the first region 23a and the second region 23b each have a planar shape, the advancing direction of chips may be easily stabilized as compared to the case where these regions each have a convex curved shape. In addition, in case that the first region 23a and the second region 23b each have a planar shape, the thickness of the protruding part 5a can be secured more easily than in case that these regions each have a concave curved shape.

In the top view, an angle $\theta 1$ may be defined as an angle formed by a virtual straight line obtained by extending a lower end in the first region 23a toward the first end X and a virtual straight line obtained by extending the first ridge line. In addition, in the top view, an angle $\theta 2$ may be defined as an angle formed by a virtual straight line obtained by extending a lower end in the second region 23b toward the first end X and an virtual straight line obtained by extending the second ridge line. If $\theta 1$ is larger than $\theta 2$, clogging of chips may be difficult to occur, and a finished surface of a workpiece may be even better.

Specifically, in case that a value of $\theta 1$ is relatively large, chips flowing to the first region 23a during the cutting process may easily advance toward the second side surface 17 rather than toward a finished surface of a workpiece. Therefore, there may be little possibility that the finished surface will be damaged by the chips.

In addition, since a value of θ2 is relatively small, there may be little possibility that chips flowing to the second region 23b during the cutting process are rebounded in the second region 23b and advance to a machined surface of a workpiece. Accordingly, since the chips are difficult to clog, chip discharge performance may be high.

Note that in case that the boundary line below the rising surface region 23 is not clear, evaluation may be performed in a cross section parallel to the top surface region 25, as illustrated in FIG. 7. A ridge line where this cross section and the rising surface region 23 intersect and the first ridge line and the second ridge line may be extended respectively and evaluation may be performed by angles formed by the ridge line, and the first ridge line and the second ridge line.

As the non-limiting example illustrated in FIG. 5, the rising surface region 23 may further include a third region 23c in addition to the first region 23a and the second region 23b. The third region 23c in the present example may be positioned between the first region 23a and the second region 23b along the second cutting edge 21, and may have a planar shape similar to the second region 23b in the non-limiting example illustrated in FIG. 5.

The third region 23c may be inclined with respect to the first region 23a and the second region 23b. In the non-limiting example illustrated in FIG. 6, θ3 may be smaller than θ2, where θ3 is an angle formed by a virtual straight line obtained by extending a lower end in the third region toward the first end X and a virtual straight line obtained by extending the second ridge line.

In addition, in the non-limiting example illustrated in FIG. 7, in a cross section parallel to the top surface region 25, an angle formed by a virtual straight line obtained by extending the third region 23c and a virtual straight line obtained by extending the second cutting edge 21 may be also indicated by θ3. Note that in FIG. 7, θ3 may be illustrated by an angle formed by the virtual straight line parallel to the ridge line intersected by the cross section and the third region 23c, and the second cutting edge 21.

The advancing direction of chips generated by the first cutting edge 19 and advancing to the first region 23a may be different from the advancing direction of chips generated by the second cutting edge 21 and advancing to the second region 23b. Therefore, in case that the chips generated by the first cutting edge 19 and the chips generated by the second cutting edge 21 are connected, a flow of the chips may become unstable. However, in case that θ3 is smaller than θ2 as described above, the advancing directions of the chips generated by the first cutting edge 19 and the chips generated by the second cutting edge 21 may change stepwise. Therefore, a flow of the chips may be easily stabilized.

In particular, in case that the virtual straight line obtained by extending the lower end in the third region 23c toward the first end X and the virtual straight line obtained by extending the second ridge line are parallel to each other, that is, in case that θ3 is 0°, a flow of the chips may be more easily stabilized. However, the fact that the two virtual straight lines are parallel does not mean that θ3 is exactly 0°. In case that θ3 is −5° to 5°, the above-described two virtual straight lines may be regarded as parallel.

In addition, in the top view, the width of the second region 23b in the direction from the base portion 3 to the first end X may be defined as W2b, and the width of the third region 23c in the direction from the base portion 3 to the first end X may be defined as W2c. At this time, in case that a maximum value of W2b is larger than a maximum value of W2c, there may be less possibility that chips generated by the second cutting edge 21 and flowing to the second region 23b and the third region 23c will go to a machined surface of a workpiece. Therefore, the surface accuracy of a finished surface of a workpiece may be better.

In addition, in case that the rising surface region 23 includes the third region 23c and a width W3 of the third region 23c in the direction from the base portion 3 to the first end X is decreased as the rising surface region 23 close to the top surface region 25, the width on the side near the top surface region 25 in the first region 23a and the second region 23b may be easily ensured to be large. Therefore, the advancing direction of the chips generated by the first cutting edge 19 and the second cutting edge 21 can be controlled more easily.

The upper surface 13 may further include a rake surface region 27 positioned between the first cutting edge 19 (first ridge line) and the second cutting edge 21 (second ridge line) and the rising surface region 23, as in the non-limiting example illustrated in FIG. 5. In the non-limiting example illustrated in FIG. 5, the rake surface region 27 may be inclined downward as separating from the first cutting edge 19 and the second cutting edge 21.

In case that the upper surface 13 includes the rake surface region 27, chips may be stabilized and easily curl in the rake surface region 27 and the rising surface region 23. Accordingly, since the advancing direction of chips is stabilized, the chips may be difficult to reach a finished surface of a workpiece.

An inclination angle of the rake surface region 27 is not limited to a specific value. The inclination angle of the rake surface region 27 at a portion along the first cutting edge 19 may be larger than the inclination angle of the rake surface region 27 at a portion along the second cutting edge 21. In this case, chips generated in the first cutting edge 19 may be difficult to clog. This may be due to the following reasons.

The first cutting edge 19 may be positioned closer to the side of the first end X than the second cutting edge 21. Therefore, a space between a machined surface of a workpiece and the first region 23a may be smaller than a space between the machined surface of the workpiece and the second region 23b. In case that the inclination angle of the rake surface region 27 at the portion along the first cutting edge 19 is relatively large, the space between the machined surface of the workpiece and the first region 23a may be large. Therefore, chips generated in the first cutting edge 19 may be difficult to clog.

In addition, in the top view, a distance from an end portion on the side of the first end X in the top surface region 25 to the first end X may be smaller than the first cutting edge 19 (first ridge line) as in the non-limiting example illustrated in FIG. 6. In case that the top surface region 25 includes the above-described configuration, the top surface region 25 may be positioned near a workpiece during the cutting process. Therefore, a space between the top surface region 25 and the workpiece may be small. Thus, chips generated by the first cutting edge 19 may have difficulty advancing toward a finished surface of a workpiece through the space between the top surface region 25 and the workpiece. As a result, the surface accuracy of a finished surface of a workpiece may be even better.

Non-limiting examples of a material of the insert 1 may include, for example, an inorganic material such as cemented carbide alloy, cermet, and ceramics. Non-limiting examples of composition of the cemented carbide alloy may include WC (tungsten carbide)-Co, WC—TiC (titanium carbide)-Co and WC—TiC—TaC (tantalum carbide)-Co.

Here, WC, TiC and TaC may be hard particles, and Co may be a binder phase. In addition, the cermet may be a sintered composite material in which a ceramic component is combined with a metal. Specific examples of the cermet may include a compound mainly composed of TiC or TiN (titanium nitride). Note that the material of the insert 1 is not limited to these materials.

In addition, although not illustrated in particular, the insert 1 may include a body containing the above-described material and a coating layer covering the body. Non-limiting examples of a material of the coating layer may include carbide, nitride, oxide, carbonate, nitroxide, carbonitride, and oxycarbonitride of titanium. The coating layer may contain only one of the above-described materials or a plurality of the above-described materials. In addition, the coating layer may include only one layer or a plurality of layers. Note that the material of the coating layer is not limited to these materials.

The coating layer can be positioned on a base by using a chemical vapor deposition (CVD) method or a physical vapor deposition (PVD) method. For example, in case that the coating layer is formed by using the above-described vapor deposition method while the base is held on an inner peripheral surface of the through hole 11, the coating layer may be positioned to entirely cover a surface of the base except for the inner peripheral surface of the through hole 11.

Cutting Tool

Next, a cutting tool 101 according to a non-limiting embodiment will be described with reference to the drawings.

Figure 11:
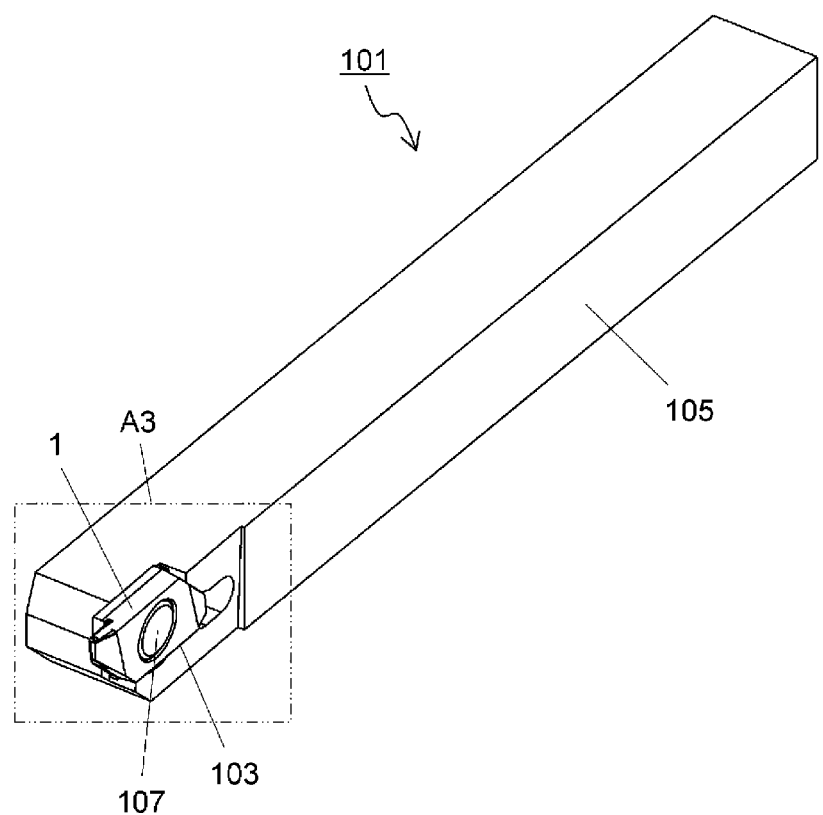
FIG. 11 is a perspective view illustrating a cutting tool according to a non-limiting embodiment.
Figure 12:
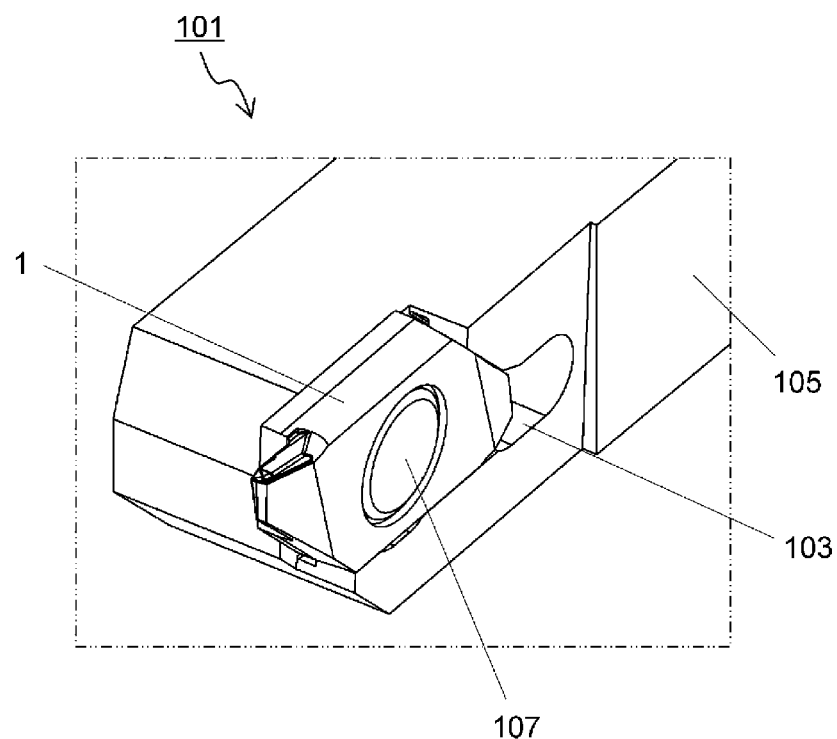
FIG. 12 is an enlarged view of a region A3 illustrated in FIG. 11.
Figure 13:
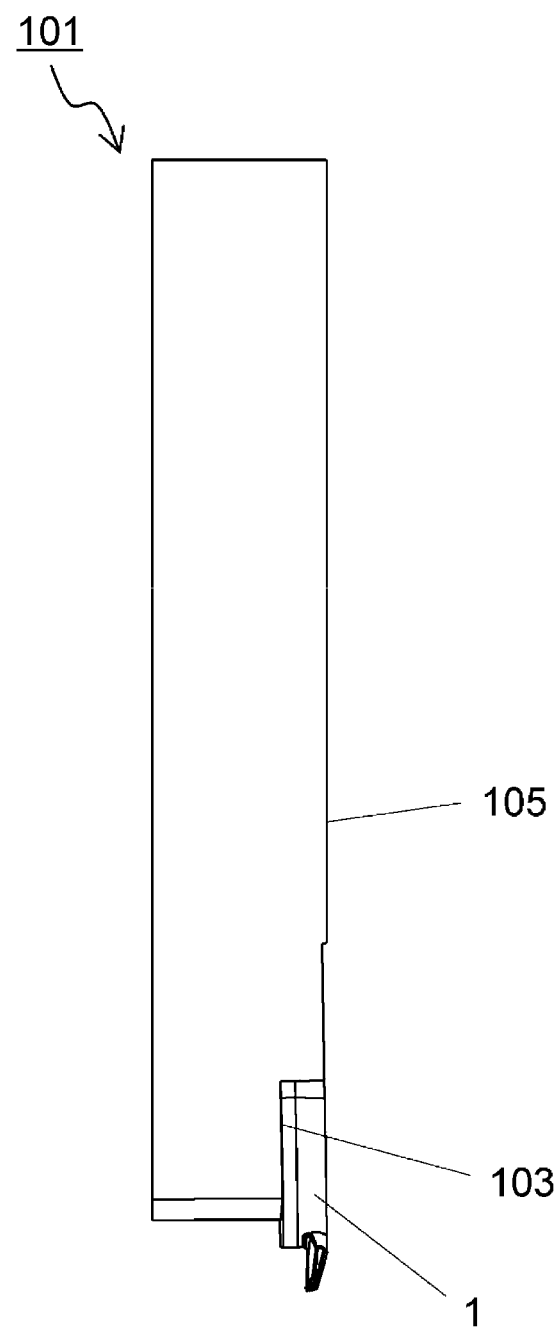
FIG. 13 is a front view of the cutting tool illustrated in FIG. 11 as viewed from the side of the upper surface.

As illustrated in FIG. 11, the cutting tool 101 according to the non-limiting embodiment may be a rod-like body extending from a front end (left lower end in FIG. 11) toward a rear end (right upper end in FIG. 11), and may include a holder 105 including a pocket 103 on the front end side, and the above-described insert 1 positioned in the pocket 103.

The pocket 103 may be a portion where the insert 1 is mounted, and may include a seating surface parallel to a second main surface of the holder 105 and a binding side surface inclined with respect to the seating surface. In addition, the pocket 103 may be open on the front end side of the holder 105.

The insert 1 may be positioned in the pocket 103. At this time, the base portion of the insert 1 may be in direct contact with the pocket 103, or a sheet may be sandwiched between the insert 1 and the pocket 103.

The insert 1 may be mounted such that at least a part of a portion used as a cutting edge in the cutting portion protrudes outward from the holder 105. In the present embodiment, the insert 1 may be mounted to the holder 105 by a screw 107.

As the holder 105, steel, cast iron, or the like can be used. Particularly, it may be preferable to use steel having high toughness among these members.

In the non-limiting embodiment, a cutting tool used for so-called turning processing may be exemplified. The cutting tool 101 according to the non-limiting embodiment can be used in post-grinding, but is not limited to such processing. For example, the cutting tool 101 according to the non-limiting embodiment may be used for inner diameter machining, outer diameter machining, and groove-forming, for example.

Method for Manufacturing Machined Product

Next, a method for manufacturing a machined product according to the non-limiting embodiment of the present invention will be described with reference to the drawings.

A machined product may be manufactured by cutting a workpiece 201. The method for manufacturing a machined product according to the present embodiment may include the following steps. That is, (1) rotating the workpiece 201,
(2) bringing the cutting tool 101 represented by the above-described embodiment into contact with the workpiece 201 that is rotating, and
(3) separating the cutting tool 101 from the workpiece 201.

Figure 14:
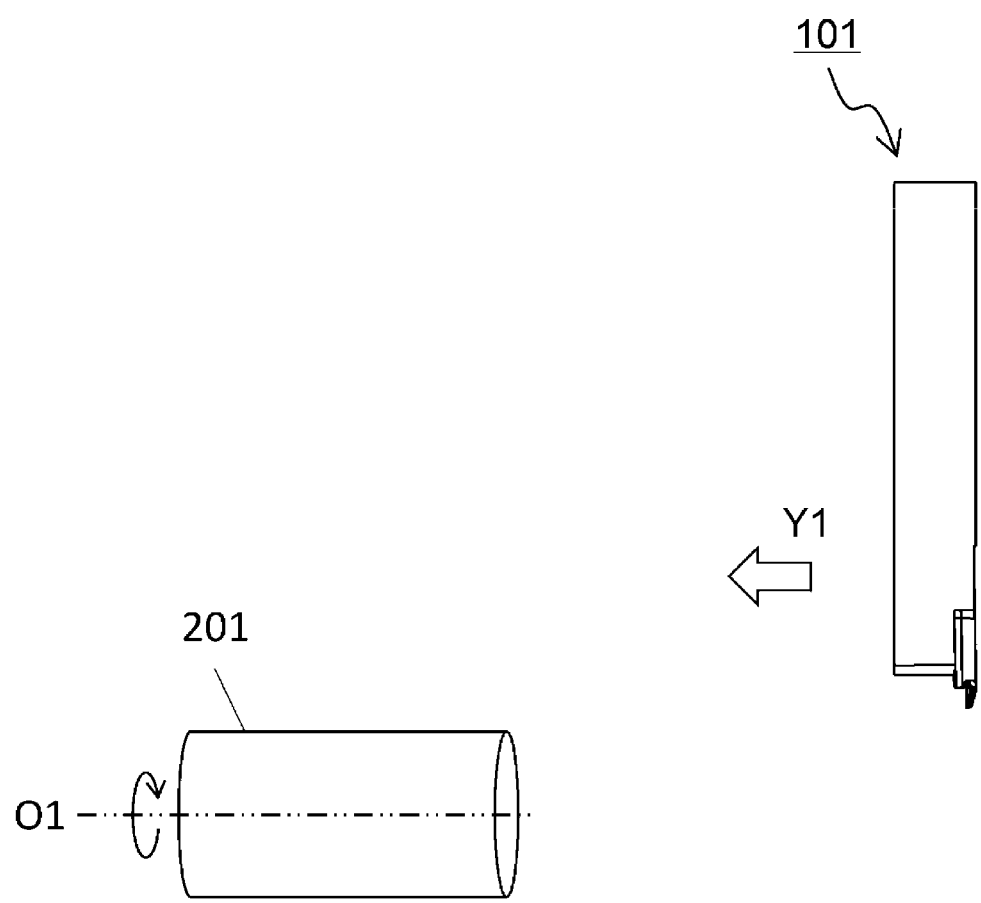
FIG. 14 is a schematic diagram illustrating a method for manufacturing a machined product according to a non-limiting embodiment.
Figure 15:
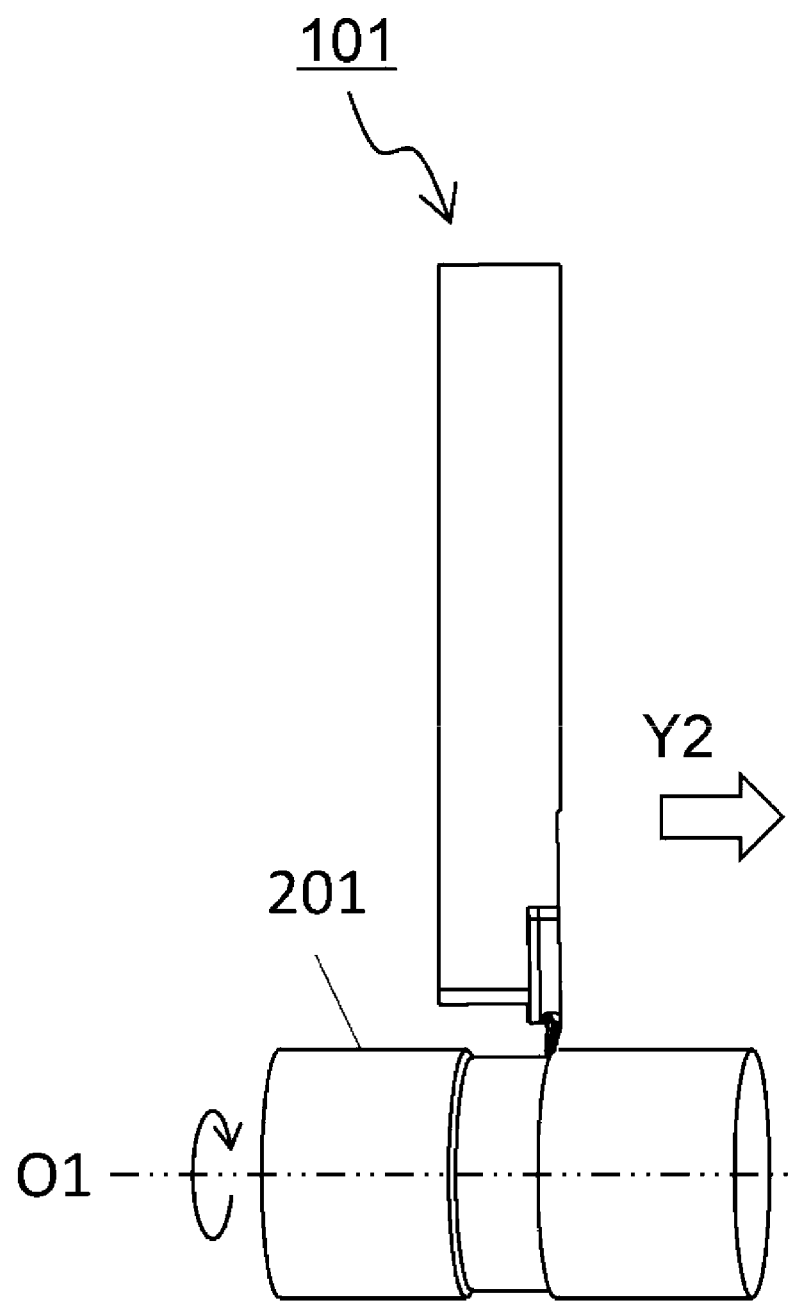
FIG. 15 is a schematic diagram illustrating a method for manufacturing a machined product according to a non-limiting embodiment.

More specifically, first, as illustrated in FIG. 14, the workpiece 201 may be rotated about an axis O1, and the cutting tool 101 may be relatively brought close to the workpiece 201. Next, as illustrated in FIG. 15, a ridge line (cutting edge) of the cutting tool 101 may be brought into contact with the workpiece 201 to cut the workpiece 201. Then, as illustrated in FIG. 16, the cutting tool 101 may be relatively moved away from the workpiece 201.

In FIG. 14, the cutting tool 101 may be moved in a Y1 direction while the axis O1 is fixed and the workpiece 201 is rotated around the axis O1, and accordingly the cutting tool 101 may be brought close to the workpiece 201. In addition, in FIG. 15, the workpiece 201 may be cut by bringing the cutting edge of the insert 1 into contact with the workpiece 201 that is rotating. In addition, in FIG. 16, the cutting tool 101 may be moved in a Y2 direction while the workpiece 201 is rotated, and accordingly the cutting tool 101 may be moved away from the workpiece 201.

Note that in the cutting process in the manufacturing method according to the non-limiting embodiment, the cutting tool 101 may be brought into contact with the workpiece 201 or the cutting tool 101 may be separated from the workpiece 201 by moving the cutting tool 101 in each step, but it is needless to say that the embodiment is not limited to such a form.

For example, in step (1), the workpiece 201 may be brought close to the cutting tool 101. Similarly, in step (3), the workpiece 201 may be moved away from the cutting tool 101. To continue the cutting process, a step of bringing the cutting edge of the insert 1 into contact with different locations of the workpiece 201 while the workpiece 201 is kept rotated may be repeated.

Note that typical examples of a material of the workpiece 201 may include carbon steel, alloy steel, stainless steel, cast iron, and non-ferrous metal.

REFERENCE SIGNS LIST

1 Insert
3 Base portion
5 Cutting portion
5a Protruding part
7 First main surface
9 Second main surface
11 Through-hole
13 Upper surface
15 First side surface
17 Second side surface
19 First cutting edge
21 Second cutting edge
23 Rising surface region
23a First region
23b Second region 23c Third region
25 Top surface region
25a First top surface
25b Second top surface
27 Rake surface region
101 Cutting tool
103 Pocket
105 Holder
107 Screw
201 Workpiece

The invention claimed is:

1. A cutting insert extending from a first end toward a second end, and comprising:
a base portion; and
a cutting portion projecting from the base portion toward the first end, wherein
the cutting portion comprises:
an upper surface extending from the base portion toward the first end;
a side surface connected to the upper surface and comprising:
a first side surface positioned on a side of the first end; and
a second side surface connected to the first side surface and positioned closer to the second end than the first side surface;
a ridge line positioned at an intersection of the upper surface and the side surface, and comprising:
a first ridge line positioned at an intersection of the upper surface and the first side surface; and
a second ridge line positioned at an intersection of the upper surface and the second side surface;
a first cutting edge positioned at the first ridge line; and
a second cutting edge positioned at the second ridge line; and
an intersection point positioned at an intersection of the first ridge line and the second ridge line,
the upper surface comprises:
a top surface region; and
a rising surface region located between the top surface and the ridge line, inclined toward the top surface region as proceeding away from the ridge line, and having a shape protruding toward the intersection point in a top view, and comprising:
a first region having a planar shape and positioned along the first ridge line;
a second region having a planar shape and positioned along the second ridge line; and
a third region having a planar shape, positioned between the first region and the second region, positioned along the second ridge, and inclined with respect to the first region and the second region;
in a cross section parallel to the top surface region, the rising surface comprises:
a first side ridge line located at the first region,
a second side ridge line located at the second region, and
a third side ridge line located at the third region, and
in the top view,
a first distance from the first ridge line to the first side ridge line increases as it approaches the intersection point
a second distance from the second ridge line to the second side ridge line decreases as it approaches the intersection point,
the third side ridge line is parallel to the second ridge line, and
a distance from the first side ridge line to the second side ridge line, in the direction from the base portion to the first end, decreases as it approaches the top surface region in a succession of cross sections parallel to the top surface region.

2. A cutting tool comprising:
a holder including a pocket; and
the cutting insert according to claim 1 positioned in the pocket.

3. A method for manufacturing a machined product, comprising:
rotating a workpiece;
bringing the cutting tool according to claim 2 into contact with the workpiece; and
separating the cutting tool from the workpiece.

4. A cutting insert extending from a first end toward a second end, and comprising:
a base portion; and
a cutting portion projecting from the base portion toward the first end, wherein
the cutting portion comprises:
an upper surface extending from the base portion toward the first end;
a side surface connected to the upper surface and comprising:
a first side surface positioned on a side of the first end; and
a second side surface connected to the first side surface and positioned closer to the second end than the first surface;
a ridge line positioned at an intersection of the upper surface and the side surface, and comprising:
a first ridge line positioned at an intersection of the upper surface and the first side surface; and
a second ridge line positioned at an intersection of the upper surface and the second side surface;
a first cutting edge positioned at the first ridge line;
a second cutting edge positioned at the second ridge line; and
an intersection point positioned at an intersection of the first ridge line and the second ridge line,
the upper surface comprises:
a top surface region; and
a rising surface region located between the top surface and the ridge line, inclined toward the top surface region as proceeding away from the ridge line, having a shape protruding toward the intersection point in a top view, and comprising:
a first region having a planar shape and positioned along the first ridge line;
a second region having a planar shape and positioned along the second ridge line; and
a third region having a planar shape, positioned between the first region and the second region, positioned along the second ridge, and inclined with respect to the first region and the second region;
in a cross section parallel to the top surface region, the rising surface comprises:
a first side ridge line located at the first region,
a second side ridge line located at the second region, and
a third side ridge line located at the third region,
in the top view,
a first distance from the first ridge line to the first side ridge line increases as it approaches the intersection point,
a second distance from the second ridge line to the second side ridge line decreases as it approaches the intersection point, a second angle is formed by a virtual straight line obtained by extending the second side ridge line toward the first end and a virtual straight line obtained by extending the second ridge line, and a third angle is formed by a virtual straight line obtained by extending the third side ridge line toward the first end and the virtual straight line obtained by extending the second ridge line, the third angle is smaller than the second angle, and a distance from the first side ridge line to the second side ridge line, in the direction from the base portion to the first end, decreases as it approaches the top surface region in a succession of cross sections parallel to the top surface region.

5. The cutting insert according to claim 4, wherein the first region further comprises a first lower end line on the opposite side of the top surface region, the second region further comprises a second lower end line on the opposite side of the top surface region, in the top view, a first lower angle is formed by a virtual straight line obtained by extending the first lower end line toward the first end and a virtual straight line obtained by extending the first ridge line, and a second lower angle is formed by a virtual straight line obtained by extending second lower end line toward the first end and a virtual straight line obtained by extending the second ridge line, and the first lower angle is greater than the second lower angle.

6. The cutting insert according to claim 5, wherein the third region further comprises a third lower end line on the opposite side of the top surface region, a third lower angle is formed by a virtual straight line obtained by extending the third lower end line toward the first end and a virtual straight line obtained by extending the second ridge line in the top view, and the third lower angle is smaller than the second lower angle.

7. The cutting insert according to claim 4, wherein, a virtual straight line obtained by extending the third lower end line toward the first end and a virtual straight line obtained by extending the second ridge line are parallel to each other in the top view.

8. The cutting insert according to claim 4, wherein, a maximum value of a width of the second region in a direction from the base portion toward the first end is larger than a maximum value of a width of the third region in a direction from the base portion toward the first end in the top view.

9. The cutting insert according to claim 4, wherein the upper surface further comprises a rake surface region positioned between the ridge line and the rising surface region and inclined downward as proceeding away from the ridge line, the rake surface region has a first inclination angle at a portion along the first ridge line and a second inclination angle at a portion along the second ridge line, and the first inclination angle is greater than the second inclination angle.

10. The cutting insert according to claim 4, wherein, a distance from the first end to the top surface region is shorter than the first ridge line in the top view.

11. A cutting tool comprising:

a holder including a pocket; and the cutting insert according to claim 4 positioned in the pocket.

12. A method for manufacturing a machined product, comprising:

rotating a workpiece;

bringing the cutting tool according to claim 11 into contact with the workpiece; and separating the cutting tool from the workpiece.

* * * * *